(12) United States Patent
Hao et al.

(10) Patent No.: US 11,386,799 B1
(45) Date of Patent: Jul. 12, 2022

(54) VISION-HAPTICS FUSED AUGMENTED REALITY SIMULATOR FOR DENTAL SURGICAL SKILL TRAINING

(71) Applicant: BEIJING UNIDRAW VR TECHNOLOGY RESEARCH INSTITUTE CO., LTD., Beijing (CN)

(72) Inventors: Aimin Hao, Beijing (CN); Yu Cong, Beijing (CN); Yongtao Zhao, Beijing (CN); Xiaohan Zhao, Beijing (CN)

(73) Assignee: BEIJING UNIDRAW VR TECHNOLOGY RESEARECH INSTITUTE CO., LTD, Beijing (CN)

( * ) Notice: Subject to any disclaimer, the term of this patent is extended or adjusted under 35 U.S.C. 154(b) by 0 days.

(21) Appl. No.: 17/270,419

(22) PCT Filed: Aug. 21, 2020

(86) PCT No.: PCT/CN2020/110381
§ 371 (c)(1),
(2) Date: Feb. 22, 2021

(87) PCT Pub. No.: WO2021/032178
PCT Pub. Date: Feb. 25, 2021

(30) Foreign Application Priority Data

Aug. 22, 2019 (CN) .......................... 201910777662.2

(51) Int. Cl.
*G06T 19/00* (2011.01)
*G09B 9/00* (2006.01)
(Continued)

(52) U.S. Cl.
CPC .............. *G09B 9/00* (2013.01); *G06T 19/006* (2013.01); *G09B 5/02* (2013.01); *G09B 23/283* (2013.01)

(58) Field of Classification Search
CPC ............ G06T 19/006; G09B 9/00; G09B 5/02
(Continued)

(56) References Cited

U.S. PATENT DOCUMENTS

| 7,812,815 B2 * | 10/2010 | Banerjee ................. G06F 3/011 |
| | | 715/757 |
| 11,270,601 B2 * | 3/2022 | Yu ........................... G06F 3/014 |

(Continued)

FOREIGN PATENT DOCUMENTS

| CN | 106537225 A | 3/2013 |
| CN | 103106348 A | 5/2013 |

(Continued)

OTHER PUBLICATIONS

International Search Report of PCT/CN2020/110381.
The first Office Action of the priority CN application.

*Primary Examiner* — Thomas J Lett
(74) *Attorney, Agent, or Firm* — J.C. Patents (57) ABSTRACT

A vision-haptics fused augmented reality simulator for dental surgical skill training, including a dental simulation training platform constructed based on an artificial head phantom; a dental operation training system based on a haptic feedback device; an observation system based on an augmented reality head-mounted display; generating a virtual dental model by modeling based on CBCT data and scan data of a patient's dental cavity, to construct a virtual dental environment; based on the virtual dental model and feature points obtained through scanning on the artificial head phantom, performing a spatial matching of a virtual dental cavity and a dental model; in a virtual dental surgery simulation method, outputting haptics information and visual information at frequencies of not less than 1000 Hz and 60 Hz, respectively; performing a visual information processing method on grid data; and performing a haptics- (Continued)

vision space calibration method based on information of an operator's head.

8 Claims, 3 Drawing Sheets

(51) Int. Cl.
*G09B 5/02* (2006.01)
*G09B 23/28* (2006.01)

(58) Field of Classification Search
USPC .......................................................... 345/633
See application file for complete search history.

(56) References Cited

U.S. PATENT DOCUMENTS

2014/0106326 A1    4/2014   Hemmer
2017/0352292 A1*  12/2017   Eid ........................... G09B 9/00
2018/0168781 A1*   6/2018   Kopelman ............ A61C 9/0046
2018/0174367 A1*   6/2018   Marom .................... G06F 3/011
2020/0005676 A1*   1/2020   Kubota .................... G09B 9/00
2021/0312834 A1*  10/2021   Maddahi .................. G05G 5/03

FOREIGN PATENT DOCUMENTS

| | | |
|---|---|---|
| CN | 103903487 A | 7/2014 |
| CN | 107529968 A | 1/2018 |
| CN | 107978195 A | 5/2018 |
| CN | 108210098 A | 6/2018 |
| CN | 109410680 A | 3/2019 |
| CN | 109700550 A | 5/2019 |
| CN | 109785374 A | 5/2019 |
| CN | 110459083 A | 11/2019 |
| WO | WO2018112427 A1 | 6/2018 |

* cited by examiner

VISION-HAPTICS FUSED AUGMENTED REALITY SIMULATOR FOR DENTAL SURGICAL SKILL TRAINING

CROSS-REFERENCE TO RELATED APPLICATIONS

This application is a national stage of International Application No. PCT/CN2020/110381, filed on Aug. 21, 2020, which claims priority to Chinese Patent Application No. 201910777662.2, filed on Aug. 22, 2019. Both of the aforementioned applications are hereby incorporated by reference in their entireties.

TECHNICAL FIELD

The present disclosure relates to the field of dental surgical training simulation, and is simulation training for simulating a dental surgical operation process and performing related dental surgical operations based on augmented reality technology, force rendering technology, computer graphics technology, motion mechanics and other related disciplines.

BACKGROUND

With improvement of people's awareness of tooth protection, demands for dental treatments such as periodontal and planting treatments are increasing, and the reality of long period and high cost of skill training for a dentist has greatly limited opportunities for people to acquire dental treatment. Based on new technologies such as computer graphics and augmented reality, the present disclosure provides a construction solution for a vision-haptics fused training simulator for augmented reality dental surgery skill, which provides a new way for dentist training.

Oral medicine is a discipline in which practices are combined with theories, and a conventional practice training of a dentist is mainly based on an artificial head phantom. A shape of the artificial head phantom is relatively close to a dental clinic environment where a patient is lying flat on a dental chair for receiving treatment, and thus a user may better train skills such as operating posture adjustment and fulcrum use, to achieve a transfer of a training effect; however, the practice process for the artificial head phantom requires a large amount of material consumption and has defects of single training case and poor realism.

In view of the deficiencies of a conventional dental training program, Moog Inc. et al., in Patent No. US009383832 B1, "HAPTIC USER INTERFACE", proposed a digital training program, which uses haptic feedback devices to generate a virtual force sense in a drilling process, replacing material consumption in a conventional training process; at the same time, a virtual environment is displayed in a double-projection mode, and unity of a visual space and a haptics space is achieved based on a mirror reflection mode, so that a virtual environment observed by a user and a virtual environment touched by the user are the same in space. A main problem of the program is that a training platform constructed by adopting a mirror reflection principle is quite different from the artificial head phantom in shape, not only the user needs to spend more time to be familiar with operating environment, meanwhile, a finger support is absent, and it is not easy to achieve a transfer of a training effect. In addition, in order to realize a space calibration of a virtual visual environment and a virtual haptics environment, an image generated by a screen needs to be reflected by a reflector before observation, and thus an operating hand cannot be observed in an operation process, causing poor operation immersion.

SUMMARY

The technical problem to be solved by the present disclosure is that: providing a vision-haptics fused augmented reality simulator for dental surgical skill training, which is close to a conventional artificial head phantom dental training platform in shape, and can be used as a finger support in an operation process; a dental model and a dental tool model that form a virtual environment are obtained through CT scanning and measurement, making simulations of various cases possible; augmented reality glasses are used for observation, and virtual environments such as the dental model and the dental tool model are superposed on real environment for display, enhancing an immersion feeling in the operation process; and a haptic feedback device is used for generating a virtual force sense, avoiding material consumption in a training process.

A technical solution of the present disclosure:

a vision-haptics fused augmented reality simulator for dental surgical skill training, including a dental simulation training platform, a dental operation training system based on a haptic feedback device, and an observation system based on an augmented reality head-mounted display;

the dental simulation training platform has a shape close to an artificial head phantom used in a dental practice training, is convenient for an user to be familiar with an operating environment, is used as a finger support and achieves a transfer of a training effect;

the dental operation training system based on the haptic feedback device fixes a bracket of the haptic feedback device onto the dental simulation training platform and replaces a dental surgical instrument with an end handle of the haptic feedback device so as to be held by the user; the user operates the end handle of the haptic feedback device to move, with a motion range covering a dental range of the artificial head phantom; the haptic feedback device can generate a specific output force to simulate force senses of touching various tissues including tooth, gum, tongue and cheek;

the observation system based on the augmented reality head-mounted display superposes a virtual environment onto a real world to perform display, receives mesh information, and displays a virtual dental environment constructed by a virtual dental model and a virtual tool model, and or observes real environments of the dental simulation training platform and the haptic feedback device, and enhances an immersion feeling in a training process;

an implementation process of the training simulator:

a. based on CBCT scan and true color scan data of a real patient, as well as size and shape measurement data of the dental surgical instrument, models of a virtual patient and the virtual tool are established to construct the virtual dental environment;

b. based on the virtual dental model and feature points obtained through scanning on the artificial head phantom, a model matching is performed, so that the virtual environment can be matched with an actual training model in spatial positions of corresponding points;

c. after the model matching is completed, the mesh information is transmitted to an virtual dental surgery simulation algorithm for an virtual dental surgery simulation calculation, the user controls a virtual tool to move by moving the end handle of the haptic feedback device, and observes from different angles through the augmented reality head-mounted display, six-degrees-of-freedom posture information of the end handle of the haptic feedback device and position information of an operator's head are acquired in real time by the virtual dental surgery simulation algorithm at a frequency of greater than 1000 Hz and a frequency of greater than 60 Hz respectively, and haptics information and the mesh information of the virtual environment are output after calculations;

d. the mesh information needs to be transmitted to the augmented reality head-mounted display in a wireless transmission mode to perform display, a visual information processing is performed before transmission, to simplify the mesh information, reduce the number of mesh vertices on the premise of ensuring a sharp feature of meshes, and increase transmission speed, to realize a refresh frequency of greater than 60 Hz;

e. based on acquired information of the operator's head, a haptics-vision space calibration matrix is obtained, a haptics-vision space calibration is performed, so that an output force felt by the user can be matched with visual information observed by the user, and after visually observing that the virtual tool touches a dental tissue in the virtual environment, a touch force in a correct direction can be felt at a correct position.

An implementation process of the dental simulation training platform is as follows:

(1) an overall shape of the dental simulation training platform is close to a dental patient receiving treatment, a shape configuration that simulates the patient lying flat on a dental chair consists of a case, a connecting portion, and a head portion, of the dental simulation training platform;

(2) the case of the dental simulation training platform functions as stably supporting and placing a host;

(3) the connecting portion of the dental simulation training platform is used for connecting the head portion with the case at a bottom, of the dental simulation training platform, functioning as a stable support, and meanwhile is used for placing the haptic feedback device; and (4) the head portion of the dental simulation training platform has a shape and a size close to a true patient's head portion, and removes a dental cavity and following sections thereof, preventing interference with the end handle of the haptic feedback device; a semi-circular ring is placed at an original position of the dental cavity and functions as a finger support during an operation process of the user.

An implementation process of the dental operation training system based on the haptic feedback device is as follows:

(1) the haptic feedback device is moved, so that a central position of working space of the haptic feedback device and a center position of the dental cavity of the dental training platform coincide, and a position of the haptic feedback device is recorded; and (2) the bracket of the haptic feedback device is designed to fix the haptic feedback device onto the dental simulation training platform, so that the haptic feedback device does not shake during use and can freely move.

An implementation process of the observation system based on the augmented reality head-mounted display is as follows:

(1) Microsoft HoloLens is selected as an augmented reality device, which can realize a wireless transmission without being limited by a cable; and (2) augmented reality glasses are used to scan the dental simulation training platform and the haptic feedback device, and a working center of the augmented reality glasses is located, and at the same time, the virtual environment is superimposed on the dental simulation training platform and the haptic feedback device to display, realizing an interaction with a holographic image in surrounding real environment.

A construction method of the virtual environment in the step a is:

(1) obtaining CBCT data of the dental cavity of the patient in a DICOM format;

(2) obtaining dental scan data of the dental cavity of the patient in stl format; and (3) obtaining a complete three-dimensional surface and a physical model of lower semi-skull after superposition and reconstruction, to form the virtual dental model.

A method of the model matching in the step b is:

(1) acquiring a spatial location, which is $(P_1, P_2, \ldots P_n)$, of a triangle mesh of the virtual dental model;

(2) sampling corresponding points on the artificial head phantom to obtain $(T_0, T_1, \ldots T_n)$; and (3) setting a spatial calibration matrix M, fitting by least square method, i.e., $$R^2 = \sum_1^n (T_i - P_i M)^2,$$

and obtaining the calibration matrix M with the smallest $R^2$.

A method of the visual information processing in the step d is:

(1) for all vertices V in a grid, defining a symmetric error matrix, which is $$Q = \sum_{p \in planse(v)} K_p,$$

where P=[a b c d] is a plane around each vertex, and may be represented by an equation, which is ax+by+cz+d=0, and $K_p = PP^T$ is a quadratic basic error matrix;

(2) defining $\Delta(v) = v^T Q v$ as an error matrix of a vertex, which is $v = [v_x\ v_y\ v_z\ 1]^T$;

(3) for an edge (v1, v2) in the grid, merging it into a vertex $v_{bar}$ after simplification, and defining $Q_{bar} = Q1 + Q2$ as an error matrix of the vertex $v_{bar}$;

(4) numerically calculating a position of the vertex $v_{bar}$ so that $\Delta(v_{bar})$ is minimal, and sequentially selecting edges with a smallest error, of a new vertex after shrinking, to perform iterative shrinkage until a requirement is met.

An algorithm of the haptics-vision space calibration in the step e is:

(1) obtaining the position information, which is P=(x, y, z, α, β, γ), of the operator's head, where x, y, and z are position information of the user's head, and α, β, γ are orientation information of the user's head;

(2) calculating the spatial matrix, which is M=R(α)·R(β)·R(γ)·Trans, of the head, and inverting the M to obtain the haptics-vision space calibration matrix $M^{-1}$, where $$R(\alpha) = \begin{pmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{pmatrix},$$

-continued $$R(\beta) = \begin{pmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{pmatrix},$$

$$R(\gamma) = \begin{pmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{pmatrix}, \text{ and}$$

$$Trans = \begin{pmatrix} 1 & 0 & 0 & x \\ 0 & 1 & 0 & y \\ 0 & 0 & 1 & z \\ 0 & 0 & 0 & 1 \end{pmatrix};$$

(3) obtaining calculated output force, which is $F=(f_0, f_1, f_2)$, converting the output force into a homogeneous matrix $$Q_F = \begin{pmatrix} 1 & 0 & 0 & 0 \\ 0 & 1 & 0 & 0 \\ 0 & 0 & 1 & 0 \\ f_0 & f_1 & f_2 & 1 \end{pmatrix},$$

applying $M^{-1}$ to the $Q_F$, obtaining transformed homogeneous matrix $$Q_{FT} = \begin{pmatrix} q_{00} & q_{01} & q_{02} & q_{03} \\ q_{10} & q_{11} & q_{12} & q_{13} \\ q_{20} & q_{21} & q_{22} & q_{23} \\ q_{30} & q_{31} & q_{32} & q_{33} \end{pmatrix},$$

and transmitting transformed output force, which is $F_T=(q_{30}, q_{31}, q_{32})$, to the haptic feedback device to output at a frequency greater than 1000 Hz.

Advantages of the present disclosure compared with the prior art are: (1) the dental simulation training platform in the present disclosure has a shape close to an artificial head phantom dental simulation training platform, and may be used as a finger support in a training process of an user, and also may be used as a spatial reference; (2) the present system uses augmented reality glasses for observation and superimposes the virtual environment with the real environment to perform display, enhancing an immersion feeling; (3) the present system provides a virtual haptics based on a haptic feedback device, reducing material consumptions in the training process, and can simulate various cases; and (4) through the haptics matching algorithm, the virtual environment observed by the user and feedback force spatial position felt by the user are unified, which facilitates a transfer of a training effect.

DESCRIPTION OF EMBODIMENTS

Technical solutions of the present disclosure are further described below in conjunction with the accompanying drawings.

Figure 2:
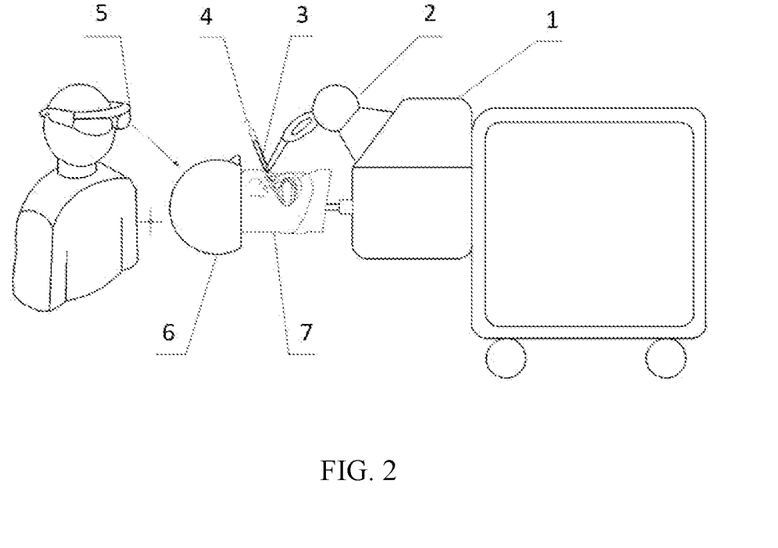
FIG. 2 is a schematic diagram of an operating principle of a system.

As shown in FIG. 2, the present disclosure relates to a vision-haptics fused augmented reality simulator for dental surgical skill training, including: a dental simulation training platform constructed based on an artificial head phantom, to be a finger support and a spatial reference during an operation process of a user; a dental operation training system based on a haptic feedback device, to simulate various force senses during dental treatment through an output force of the haptic feedback device; obtaining a virtual dental model by modeling based on CBCT scan data and true color scan data of a dental patient, and obtaining a virtual tool model by modeling based on measured size of a dental surgical tool, to construct a virtual dental training environment, realizing simulation of a plurality of dental cases; spatially matching the virtual dental model and the virtual tool model, so that the virtual dental environment matches with space of the dental simulation training platform; an observation system based on an augmented reality head-mounted display, which may realize a coordinated display of virtual and real environments, such as the virtual environment, the dental simulation training platform, and a user's operating hand, enhancing an immersive feeling; transmitting a spatial posture of the haptic feedback device, orientation of the augmented reality head-mounted display, matched virtual dental cavity and tool model, and other data into a dental surgery simulation algorithm, and calculating output force information and visual mesh information and then respectively transmitting to the haptic feedback device and the augmented reality head-mounted display to perform output, so that a closed loop is realized; simplifying the visual information transmitted by the dental surgical simulation algorithm, based on a grid simplification algorithm, to realize a visual thread refresh frequency greater than 30 Hz; and calibrating a direction of the output force of a computer based on a haptics-vision space calibration algorithm, so that the direction of the output force felt by the user is consistent with a direction of observation, and then transmitting the output force to the haptic feedback device for output.

Compared with the conventional dental skill training program using an artificial head phantom, the present system generates a virtual force sense by means of the haptic feedback device, saving material consumptions of trainings using the simulation head model, and solving a problem that the training case is single; compared with the existing dental digital training program, the present system realizes a simultaneous observation and a force sense matching of virtual and real environments, such as the virtual environment, the dental simulation training platform, and the user operating hand, and has obvious characteristics such as a multi-channel visual feedback, a vision-touch fused feedback and the like, conforming to a clinical operation habit.

Figure 3:
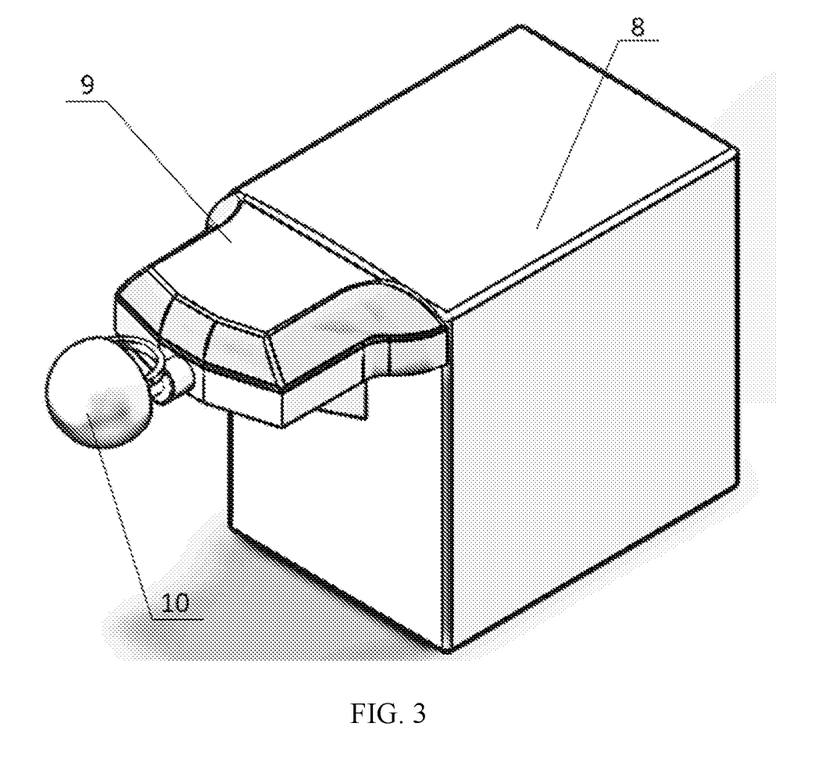
FIG. 3 is a schematic diagram of a dental simulation training platform.

As shown in FIG. 3, the dental simulation training platform includes three parts such as a bottom case 8, a connecting portion 9, and a head portion 10, and a system composition and a working principle are shown in FIG. 2, the dental operation training system based on the haptic feedback device consists of three parts such as a haptic feedback device bracket 1, a haptic feedback device 2, and an operation handle 3 of the haptic feedback device, and the observation system based on the augmented reality head-mounted display mainly consists of augmented reality glasses 5, and a user can observe a virtual dental tool 4 and a virtual dental environment 7 through the augmented reality glasses.

Figure 1:
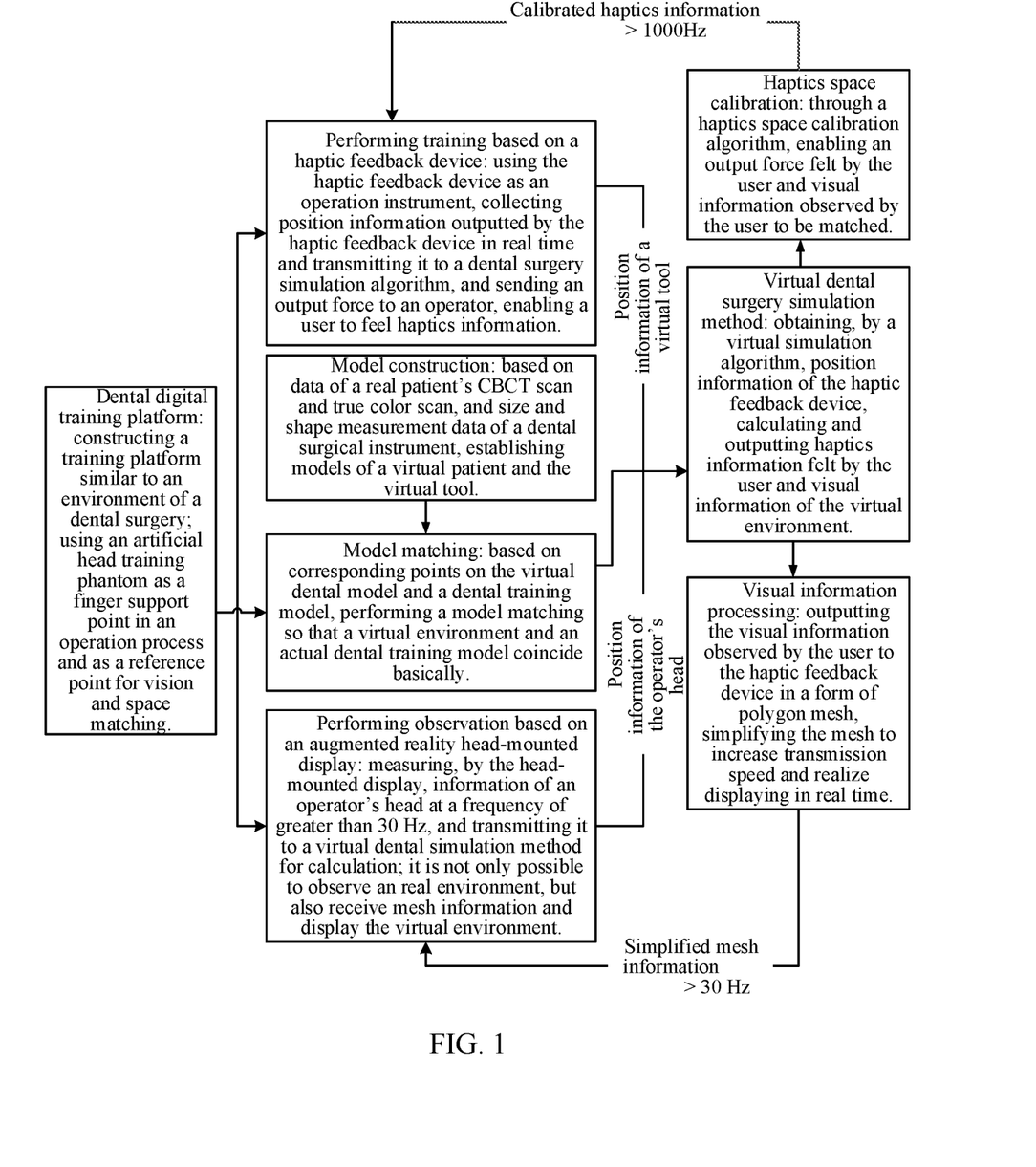
FIG. 1 is a system module of the present disclosure.

As shown in FIG. 1, a specific implementation of the present disclosure includes the following steps:

Step 1: by imitating a conventional dental training artificial head phantom, constructing a dental simulation training platform of the present system, mainly including three parts such as a case, a connecting portion and a head portion, and FIG. 3 is a schematic diagram of a dental simulation training platform.

Implementation steps of the dental simulation training platform are as follows: designing a shape of the case to be a cuboid, which may be not only used for placing a host, but also for stable support; measuring height of head of a patient in an actual treatment process, and selecting an intermediate value as height of the case; measuring a width of a dental treatment chair to serve as a width of the case; a length of the case is ensuring the host can be put therein.

Implementation steps of the connecting portion of the dental simulation training platform are as follows: designing a shape of the connecting portion to be close to a shoulder of the patient, and measuring a size of a shoulder of a real patient who is an adult, to determine a size of the connecting portion.

Implementation steps of the head portion of the dental simulation training platform are as follows: performing a design with reference to a size and a shape of a real patient's head; deleting parts below a nasal cavity to prevent interference with the haptic feedback device; selecting a dental size of 1.2 times of the real patient's dental, and designing an irregular arc-shaped circular ring to be placed in an original dental position for a finger support in the operation process.

Step 2: implementing a dental training system based on the haptic feedback device, placing the haptic feedback device on the dental simulation training platform, to generate a virtual force sense and avoid material consumptions, and implementation steps are as follows:

(1) moving the haptic feedback device so that a central position of working space of the haptic feedback device and a central position of a dental of the artificial head phantom coincide, and recording a position of the haptic feedback device;

(2) in the connecting portion, opening a groove by imitating a bottom shape of the haptic feedback device, the groove being used for fixing the haptic feedback device and ensuring free movements of the device.

Step 3: implementing a display system based on the augmented reality head-mounted display: selecting a Microsoft HoloLens head-mounted display as a type of the augmented reality head-mounted display, scanning the dental simulation training platform and the augmented reality glasses using the head-mounted display, and calibrating real environment.

Step 4: constructing a virtual dental model and a virtual patient model: (1) scanning a dental cavity of the patient using a CBCT device and a true color scanning device to obtain CBCT data in a DICOM format and dental scan data in stl format, of the patient's dental cavity;

(2) obtaining a complete three-dimensional surface and a physical model of lower semi-skull after superposition and reconstruction to form a virtual dental model; and (3) measuring a shape and a size of a tool used in a dental surgery, and modeling to obtain a virtual tool model;

Step 5: performing a space calibration on the virtual dental model, with specific implementations being as follows: (1) acquiring a spatial position, which is ($P_1, P_2, \ldots P_n$), of a triangular grid of the virtual dental model; (2) sampling corresponding points on the artificial head phantom to obtain ($T_0, T_1, \ldots T_n$); and (3) setting a spatial calibration matrix as M, fitting by least square method, that is, $$R^2 = \sum_1^n (T_i - P_i M)^2,$$

and obtaining the calibration matrix M;

Step 6: transmitting the virtual dental model and the virtual tool model to a virtual dental surgery simulation method to obtain simulation data for calculation; and the step is completed offline, and thus it is hoped that the models have more mesh vertices to improve calculation accuracy;

Step 7: in the virtual dental surgery simulation method, performing a haptic calculation thread at a frequency greater than 1000 Hz: collecting six-degrees-of-freedom posture information of the haptic feedback device, controlling a tool movement in the virtual environment, to perform an interactive calculation with the virtual dental model; and after the calculation is completed, outputting and sending output force information, which firstly undertakes a haptics-vision space calibration, to the haptics feedback device to generate a feedback force.

Step 8: in the virtual dental surgery simulation method, performing a haptic calculation thread at a frequency greater than 30 Hz: collecting position information of head of an operator measured by a head-mounted display, and outputting mesh information of the virtual environment after calculation; after a visual information processing, sending the mesh information to an augmented reality head-mounted display, and superimposing realistic virtual environment on to a real-world;

Step 9: performing the haptics-vision space calibration:

(1) obtaining the position information, which is P=(x, y, z, α, β, γ) of the operator's head, where x, y, and z are position information of the patient's head, and α, β, and γ are orientation information of a user's head;

(2) calculating a spatial matrix, which is M=R(α)·R(β)·R(γ)·Trans of the head, and inverting the M to obtain a haptics-vision space calibration matrix $M^{-1}$, where $$R(\alpha) = \begin{pmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{pmatrix},$$

$$R(\beta) = \begin{pmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{pmatrix},$$

$$R(\gamma) = \begin{pmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{pmatrix}, \text{ and}$$

$$Trans = \begin{pmatrix} 1 & 0 & 0 & x \\ 0 & 1 & 0 & y \\ 0 & 0 & 1 & z \\ 0 & 0 & 0 & 1 \end{pmatrix};$$

(3) obtaining the output force, which is $F=(f_0, f_1, f_2)$ calculated by a computer, converting the output force into a homogeneous matrix, which is $$Q_F = \begin{pmatrix} 1 & 0 & 0 & 0 \\ 0 & 1 & 0 & 0 \\ 0 & 0 & 1 & 0 \\ f_0 & f_1 & f_2 & 1 \end{pmatrix},$$

and applying the $M^{-1}$ to the $Q_F$, obtaining transformed homogeneous matrix, which is $$Q_{FT} = \begin{pmatrix} q_{00} & q_{01} & q_{02} & q_{03} \\ q_{10} & q_{11} & q_{12} & q_{13} \\ q_{20} & q_{21} & q_{22} & q_{23} \\ q_{30} & q_{31} & q_{32} & q_{33} \end{pmatrix},$$

and transmitting transformed output force $F_T=(q_{30}, q_{31}, q_{32})$ to the haptic feedback device;

Step 10: performing the visual information processing:

(1) for all vertices V in a grid, defining a symmetric error matrix, which is $$Q = \sum_{p \in planse(v)} K_p,$$

where $P=[a\ b\ c\ d]$ is a plane around each vertex, and may be represented by an equation, which is $ax+by+cz+d=0$, and $K_p=PP^T$ is a quadratic basic error matrix;

(2) defining $\Delta(v)=v^T Q v$ as an error matrix of a vertex, which is $v=[v_x\ v_y\ v_z\ 1]^T$;

(3) for an edge (v1, v2) in the grid, merging into a vertex $v_{bar}$ after simplification, and defining $Q_{bar}=Q1+Q2$ as an error matrix of the vertex $v_{bar}$; and (4) numerically calculating a position of the vertex $v_{bar}$ so that $\Delta(v_{bar})$ is minimal, and sequentially selecting edges with a smallest error, of a new vertex after shrinking, to perform iterative shrinkage until a requirement is met.

What is claimed is:

1. A vision-haptics fused augmented reality simulator for dental surgical skill training, comprising a simulation training platform, a dental operation training system based on a haptic feedback device, and an observation system based on an augmented reality head-mounted display;

the dental training platform has a shape close to an artificial head phantom used in a dental practice training, is convenient for an user to be familiar with an operating environment, is used as a finger support, and achieves a transfer of a training effect;

the dental operation training system based on the haptic feedback device fixes a bracket of the haptic feedback device onto the dental training platform and replaces a dental surgical instrument with an end handle of the haptic feedback device so as to be held by the user; the user operates the end handle of the haptic feedback device to move, with a motion range covering a dental range of the artificial head phantom; the haptic feedback device can generate a specific output force to simulate haptics of touching various tissues comprising tooth, gum, tongue and cheek;

the observation system based on the augmented reality head-mounted display superposes a virtual environment onto a real world to perform display, receives mesh information, and displays a virtual dental environment constructed by a virtual dental model and a virtual tool model, or observes real environments of the dental training platform and the haptic feedback device, and enhances an immersion feeling in a training process;

an implementation process of the training simulator:

a. based on CBCT scan and true color scan data of a patient, as well as size and shape measurement data of the dental surgical instrument, the virtual dental model and the virtual tool model are established to construct the virtual dental environment;

b. based on the virtual dental model and feature points on the artificial head phantom, a model matching is performed, so that the virtual environment is matched with a training model in spatial positions of corresponding points;

c. after the model matching is completed, the mesh information is transmitted to an virtual dental surgery simulation algorithm for an virtual dental surgery simulation calculation, the user controls a virtual tool to move through the end handle of the haptic feedback device, and observes from different angles through the augmented reality head-mounted display, posture information of the end handle of the haptic feedback device and position information of an operator's head are acquired in real time by the virtual dental surgery simulation algorithm at a frequency of greater than 1000 Hz and a frequency of greater than 60 Hz, respectively, and after calculation, haptics information and the mesh information of the virtual environment are output;

d. the mesh information needs to be transmitted to the augmented reality head-mounted display in a wireless transmission mode to perform display, a visual information processing is performed before transmission, to simplify the mesh information, reduce the number of mesh vertices on the premise of ensuring a sharp feature of a mesh model, and increase transmission speed, to realize a refresh frequency of greater than 60 Hz;

e. based on acquired information of the operator's head, a haptics-vision space calibration matrix is obtained, and a haptics-vision space calibration is performed, so that an output force felt by the user is matched with visual information observed by the user, and after visually observing that the virtual tool touches a dental tissue in the virtual environment, a touch force in a correct direction can be felt at a correct position.

2. The vision-haptics fused augmented reality simulator for dental surgical skill training according to claim 1, wherein an implementation process of the dental training platform is as follows:

(1) an overall shape of the dental training platform is close to a dental patient receiving treatment, a shape configuration that simulates the patient lying flat on a dental chair consists of a case, a connecting portion, and a head portion, of the dental training platform;

(2) the case of the dental training platform functions as stably supporting and placing a host;

(3) the connecting portion of the dental training platform is used for connecting the head portion with the case at a bottom, of the dental training platform, functioning as a stable support, and meanwhile is used for placing the haptic feedback device; and (4) the head portion of the dental training platform has a shape and a size close to a true patient's head portion, and removes a dental cavity and sections below thereof, preventing interference with the end operating handle of the haptic feedback device; a semi-circular ring is placed at an original position of the dental cavity and functions as a finger support during an operation process of the user.

3. The vision-haptics fused augmented reality simulator for dental surgical skill training according to claim 1, wherein an implementation process of the dental operation training system based on the haptic feedback device is as follows:

(1) the haptic feedback device is moved, so that a central position of working space of the haptic feedback device and a center position of the dental cavity of the dental training platform coincide, and a position of the haptic feedback device is recorded; and (2) the bracket of the haptic feedback device is designed to fix the haptic feedback device onto the dental training platform, so that the haptic feedback device does not shake during use and can freely move.

4. The vision-haptics fused augmented reality simulator for dental surgical skill training according to claim 1, wherein an implementation process of the observation system based on the augmented reality head-mounted display is as follows:

(1) Microsoft HoloLens is selected as an augmented reality device, and the device can realize a wireless transmission without being limited by a cable; and (2) augmented reality glasses are used to scan the dental training platform and the haptic feedback device, and a working center of the augmented reality glasses is located, and at the same time, the virtual environment is superimposed on the dental training platform and the haptic feedback device to perform display, realizing an interaction with a holographic image in surrounding real environment.

5. The vision-haptics fused augmented reality simulator for dental surgical skill training according to claim 1, wherein a construction method of the virtual environment in the step a is:

(1) obtaining CBCT data of the dental cavity of the patient in a DICOM format;

(2) obtaining dental scan data of the dental cavity of the patient in stl format; and (3) obtaining a complete three-dimensional surface and a physical model of lower semi-skull after superposition and reconstruction, to form the virtual dental model.

6. The vision-haptics fused augmented reality simulator for dental surgical skill training according to claim 5, wherein a method of the model matching in the step b is:

(1) acquiring a spatial location, which is $(P_1, P_2, \ldots P_n)$, of a triangle grid of the virtual dental model;

(2) sampling corresponding points on the artificial head phantom to obtain $(T_0, T1, \ldots T_n)$; and (3) setting a spatial matrix, calibration matrix M, fitting by least square method, i.e., $$R^2 = \sum_{1}^{n} (T_i - P_i M)^2,$$

and obtaining the calibration matrix M with the smallest $R^2$.

7. The vision-haptics fused augmented reality simulator for dental surgical skill training according to claim 1, wherein a method of the visual information processing in the step d is:

(1) for all vertices V in a grid, defining a symmetric error matrix, which is $$Q = \sum_{p \in planse(v)} K_p,$$

where $P=[a\ b\ c\ d]$ is a plane around each vertex, and may be represented by an equation, which is $ax+by+cz+d=0$, and $K_p = PP^T$ is a quadratic basic error matrix;

(2) defining $\Delta(v) = v^T Q v$ as an error matrix of a vertex, which is $v = [v_x\ v_y\ v_z\ 1]^T$;

(3) for an edge (v1, v2) in the grid, merging into a vertex $v_{bar}$ after simplification, and defining $Q_{bar} = Q1 + Q2$ as an error matrix of the vertex $v_{bar}$; and (4) numerically calculating a position of the vertex $v_{bar}$ so that $\Delta(v_{bar})$ is minimal, and sequentially selecting edges with a smallest error, of a new vertex after shrinking, to perform iterative shrinkage until a requirement is met.

8. The vision-haptics fused augmented reality simulator for dental surgical skill training according to claim 1, wherein an algorithm of the haptics-vision space calibration in the step e is:

(1) obtaining the position information, which is $P=(x, y, z, \alpha, \beta, \gamma)$, of the operator's head, where x, y, and z are position information of the user's head, and $\alpha, \beta, \gamma$ are orientation information of the user's head;

(2) calculating the spatial matrix, which is $M = R(\alpha) \cdot R(\beta) \cdot R(\gamma) \cdot \text{Trans}$, of the head, and inverting the M to obtain the haptics-vision space calibration matrix $M^{-1}$, where $$R(\alpha) = \begin{pmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{pmatrix},$$

$$R(\beta) = \begin{pmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{pmatrix},$$

$$R(\gamma) = \begin{pmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{pmatrix}, \text{ and}$$

$$\text{Trans} = \begin{pmatrix} 1 & 0 & 0 & x \\ 0 & 1 & 0 & y \\ 0 & 0 & 1 & z \\ 0 & 0 & 0 & 1 \end{pmatrix};$$

(3) obtaining calculated output force, which is $F=(f_0, f_1, f_2)$, converting the output force into a homogeneous matrix $$Q_F = \begin{pmatrix} 1 & 0 & 0 & 0 \\ 0 & 1 & 0 & 0 \\ 0 & 0 & 1 & 0 \\ f_0 & f_1 & f_2 & 1 \end{pmatrix},$$

applying $M^{-1}$ to the $Q_F$, obtaining transformed homogeneous matrix $$Q_{FT} = \begin{pmatrix} q_{00} & q_{01} & q_{02} & q_{03} \\ q_{10} & q_{11} & q_{12} & q_{13} \\ q_{20} & q_{21} & q_{22} & q_{23} \\ q_{30} & q_{31} & q_{32} & q_{33} \end{pmatrix},$$

and transmitting transformed output force, which is $F_T=(q_{30}, q_{31}, q_{32})$, to the haptic feedback device to output at a frequency greater than 1000 Hz.

* * * * *